United States Patent
Lee

(10) Patent No.: US 9,254,843 B2
(45) Date of Patent: Feb. 9, 2016

(54) APPARATUS AND METHOD OF ASSISTING PARKING

(71) Applicant: HYUNDAI MOBIS Co., Ltd., Yongin-si, Gyeonggi-do (KR)

(72) Inventor: Seong Soo Lee, Yongin-si (KR)

(73) Assignee: HYUNDAI MOBIS CO., LTD., Yongin-si, Gyeonggi-do (KR)

(*) Notice: Subject to any disclaimer, the term of this patent is extended or adjusted under 35 U.S.C. 154(b) by 0 days.

(21) Appl. No.: 14/499,306

(22) Filed: Sep. 29, 2014

(65) Prior Publication Data
US 2015/0127217 A1    May 7, 2015

(30) Foreign Application Priority Data
Nov. 5, 2013    (KR) .................. 10-2013-0133446

(51) Int. Cl.
*B60W 30/06* (2006.01)
*G06K 9/00* (2006.01)
*G06T 7/00* (2006.01)

(52) U.S. Cl.
CPC ........... *B60W 30/06* (2013.01); *G06K 9/00798* (2013.01); *G06K 9/00812* (2013.01); *G06T 7/0085* (2013.01)

(58) Field of Classification Search
CPC ............. B60W 30/06; G06K 9/00798; G06K 9/00812; G06T 7/0085
USPC .......................................................... 701/36
See application file for complete search history.

(56) References Cited

U.S. PATENT DOCUMENTS

| | | | |
|---|---|---|---|
| 2010/0033348 A1* | 2/2010 | Kawabata et al. | 340/932.2 |
| 2010/0039292 A1* | 2/2010 | Scherl et al. | 340/932.2 |
| 2012/0194355 A1* | 8/2012 | Thomas et al. | 340/932.2 |
| 2013/0162825 A1* | 6/2013 | Yoon et al. | 348/148 |

* cited by examiner

Primary Examiner — Rodney Butler
Assistant Examiner — Anne Mazzara
(74) Attorney, Agent, or Firm — Paratus Law Group, PLLC

(57) ABSTRACT

Disclosed are an apparatus and a method of assisting parking, and the apparatus for assisting parking includes: an around view monitoring (AVM) system including a plurality of cameras mounted in a vehicle, and configured to combine images photographed by the respective cameras, and output a combined image signal in a form of an around view; a controller configured to analyze the combined image signal and detect a parking guide line, calculate a distance between the detected parking guide line and the vehicle, and generate control information corresponding to the calculated distance; and a guide unit configured to output control information.

11 Claims, 9 Drawing Sheets

APPARATUS AND METHOD OF ASSISTING PARKING

CROSS-REFERENCE TO RELATED APPLICATIONS

The present application claims priority to Korean Patent Application Number 10-2013-0133446 filed Nov. 5, 2013, the entire contents of which the application is incorporated herein for all purposes by this reference.

TECHNICAL FIELD

The present invention relates to an apparatus and a method of assisting parking, and more particularly, to an apparatus and a method of assisting parking, which analyze an around view monitoring (AVM) combined image, and assist a driver to operate a vehicle within a range in which a guide line or a corner of a parking section is detectable.

BACKGROUND

Parking of a vehicle can be a difficult operation even for a skilled driver, as well as a beginner driver or an aged driver, and particularly, when an obstacle, another vehicle, or the like is positioned around a parking section, a driver has considerable difficulty in operating a vehicle for parking. In this respect, demands for a parking assist system for assisting a driver to safely park a vehicle have increased.

According to the demands in a market, and a recent increase in a motor-driven power steering (MDPS) mounted vehicle, a vehicle, to which an ultrasonic sensor-based parking assist system is applied, capable of reducing burdens of a driver and increasing convenience for a driver at low cost has increased.

However, the ultrasonic sensor-based parking assist system according to the related art has a unique limit in that another vehicle or an obstacle needs to be positioned within a predetermined region from a parking section space in order to recognize the parking section space by the ultrasonic sensor. In order to solve the problem, an around view monitoring (AVM) system for recognizing a parking section based on an image signal generated by a camera has been recently developed and commercialized.

However, since a driver directly operates a steering wheel and operates the vehicle to move within a vicinity of a parking line during a parking section recognizing operation in the parking assist system in the related art, a distance between the parking line and the vehicle is larger than a predetermined distance or more contrary to an intention of the driver, such that the distance between the parking line and the vehicle may exceed an effective detection range of the ultrasonic sensor or the camera.

SUMMARY

The present invention has been made in an effort to improve convenience for a driver while parking by analyzing a combined image of an around view monitoring (AVM) system, and generating information (for example, a screen display or a guide message) necessary for accurately recognizing a parking section.

Objects of the present invention are not limited to the objects described above, and other objects that are not described will be clearly understood by a person skilled in the art from the description below.

An exemplary embodiment of the present invention provides an apparatus for assisting parking, including: an around view monitoring (AVM) system including a plurality of cameras mounted in a vehicle, and configured to combine images photographed by the respective cameras, and generate a combined image signal in a form of an around view; a controller configured to analyze the combined image signal and detect a parking guide line, calculate a distance between the detected parking guide line and the vehicle, and generate control information corresponding to the calculated distance; and a guide unit configured to convert the control information into a predetermined form, and output the converted control information.

Another exemplary embodiment of the present invention provides an apparatus for assisting parking, including: an around view monitoring (AVM) system including a plurality of cameras mounted in a vehicle, and configured to combine images photographed by the respective cameras, and generate a combined image signal in a form of an around view including a predetermined region around the vehicle from the vehicle; a guide unit configured to display the combined image; and a controller configured to control the guide unit so that a parking assist object is displayed, determine whether a corner of a parking section exists within the parking assist object, and generate control information corresponding to a result of the determination. Here, the parking assist object may be an object overlapping the combined image so as to indicate a predetermined region in which the corner is recognizable.

Yet another exemplary embodiment of the present invention provides a method of operating a parking assist apparatus, including: combining images received from a plurality of cameras mounted in a vehicle, and generating a combined image signal in a form of an around view; analyzing the combined image signal and detecting a parking guide line; calculating a distance between the detected parking guide line and the vehicle; generating control information corresponding to the calculated distance; and converting the control information into at least one form of an image, a sound, and a vibration and outputting the converted control information.

Still yet another exemplary embodiment of the present invention provides a method of operating a parking assist apparatus, including: combining images received from a plurality of cameras mounted in a vehicle, and generating a combined image signal in a form of an around view; displaying a parking assist object overlapping the combined image; determining whether a corner of a parking section exists within the parking assist object; generating control information corresponding to a result of the determination; and outputting an alarm signal corresponding to the control information. Here, the parking assist object may be an object overlapping the combined image so as to indicate a predetermined region in which the corner is recognizable.

Other detailed matters of the exemplary embodiments are included in the detailed description and the drawings.

According to at least one of the exemplary embodiments of the present invention, it is possible to provide a driver with guide information assisting the driver to operate a vehicle to a region in which a parking section may be accurately recognized.

Particularly, it is possible to enable a driver to intuitively recognize whether parking is available at a current position of a vehicle by calculating a distance between the vehicle and a parking guide line and providing the driver with different guide information according to a result of the calculation.

It is also possible to help a driver to easily recognize a distance from a vehicle to a parking section and select an operation range of the vehicle for parking, by displaying a virtual index (hereinafter, a "parking assist object" to be described below) displaying a region, in which a corner of the parking section is recognizable, together with a combined image.

The effects of the present invention are not limited to the aforementioned effects, and other effects, which are not mentioned above, will be clearly understood by those skilled in the art from the claims.

DETAILED DESCRIPTION

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Meanwhile, terminologies used in the present invention are to explain exemplary embodiments rather than limiting the present invention.

Unless particularly stated otherwise in the present specification, a singular form also includes a plural form. "Comprises" and/or "comprising" used herein does not exclude the existence or addition of one or more other components, steps, operations and/or elements in or to mentioned components, steps, operations, and/or devices.

In the present specification, names of constituent elements are classified as a first . . . , a second . . . , and the like so as to discriminate the constituent elements having the same name, and the names are not essentially limited to the order in the description below.

Figure 1:
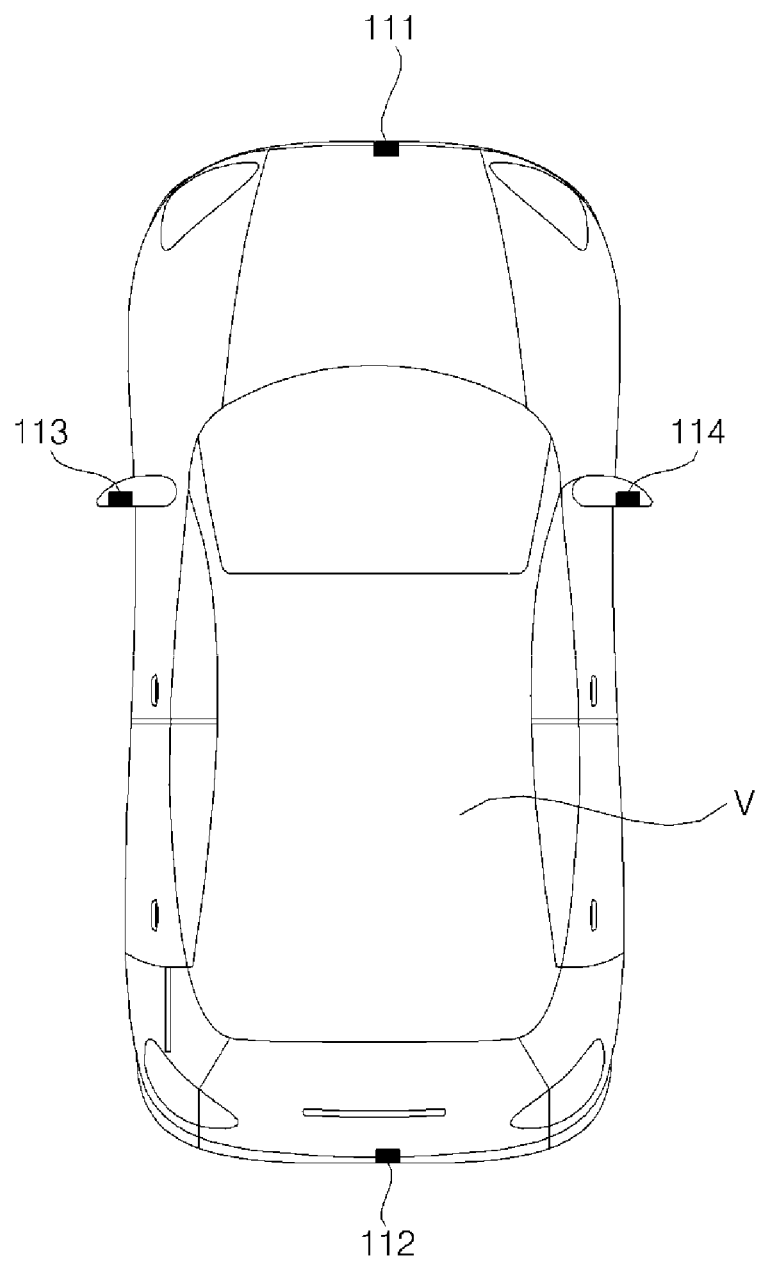
FIG. 1 is a diagram illustrating an example of a case where a camera of an AVM system is mounted in a vehicle according to an exemplary embodiment of the present invention.

FIG. 1 is a diagram illustrating an example of a case where a camera of an AVM system 110 is mounted in a vehicle V according to an exemplary embodiment of the present invention.

Referring to FIG. 1, the AVM system 110 mounted in the vehicle V may include a plurality of cameras 111, 112, 113, and 114. Here, the plurality of cameras 111, 112, 113, and 114 may be four so as to obtain images in a front direction, a rear direction, a left-lateral direction, and a right-lateral direction of the vehicle V, but more or less than four cameras may be included according to a view angle, a mounted position, or the like of the camera.

The plurality of cameras 111, 112, 113, and 114 are mounted in the vehicle V, and photographs physical spaces existing within a predetermined distance from the vehicle V and generates image signals. Here, the plurality of cameras 111, 112, 113, and 114 may be super wide angle cameras having a view angle of 180 degrees or more.

The first camera 111 may be mounted at a front side of the vehicle V to photograph a front image. The first camera 111 may be mounted in a part of a front bumper. The second camera 112 may be mounted at a rear side of the vehicle V to photograph a rear image. The second camera 112 may be mounted in a part of a rear bumper, or an upper part or a lower part of a license plate. The third camera 113 may be mounted at a left-lateral side of the vehicle V to photograph an image around the left-lateral side. The third camera 113 may be mounted in a part of a left side mirror of the vehicle V or a part of a front fender. The fourth camera 114 may be mounted at a right-lateral side of the vehicle V to input an image around the right-lateral side. The fourth camera 114 may be mounted in a part of a right side mirror of the vehicle V or a part of the front fender.

Figure 2:
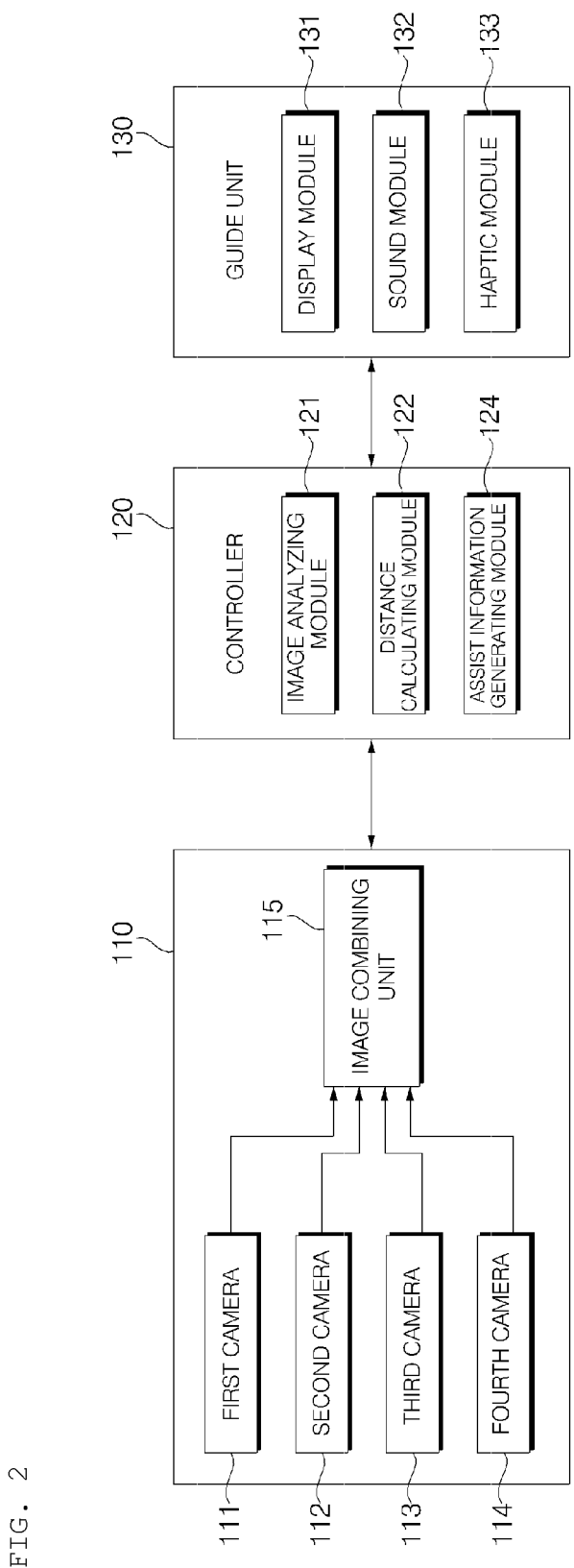
FIG. 2 is a block diagram illustrating a parking assist apparatus according to a first exemplary embodiment of the present invention.

FIG. 2 is a block diagram illustrating a parking assist apparatus according to a first exemplary embodiment of the present invention.

Referring to FIG. 2, the parking assist apparatus according to the first exemplary embodiment of the present invention includes an AVM system 110, a controller 120, and a guide unit 130.

First, the AVM system 110 may include a plurality of cameras and an image combining unit which are mounted in a vehicle V. The image combining unit 115 may combine image signals of respective channels generated by the plurality of cameras, and output an around view image similar to an image of a region of a predetermined distance from the vehicle V, which is viewed in a direction of a vertical upper end of the vehicle V. In this case, as described with reference to FIG. 1, the plurality of cameras 111, 112, 113, and 114 may be mounted at a front side, a rear side, a left side, and a right side of the vehicle V, respectively, but is not limited thereto, and mounted positions of the cameras or the number of mounted cameras may be various according to the type of vehicle, a size of the vehicle, a shape of a vehicle body, and the like.

Next, the controller 120 may receive a combined image signal from the AVM system 110, analyze the combined image signal, and detect a parking guide line GL. Further, the controller 120 may calculate a distance between the parking guide line GL and the vehicle V, and generate control information corresponding to the calculated distance.

The controller 120 may include an image analyzing module 121, a distance calculating module 122, and an assistance information generating module 124. First, the image analyzing module 121 may convert the combined image to an edge image by applying an edge detection algorithm to the combined image, and set at least one of the edges included in the edge image as the parking guide line GL. Here, the parking guide line GL may mean a parking line L positioned at a boundary of a parking section and a travelling region among parking lines L configuring the parking section, as illustrated in FIG. 3.

As a matter of course, when the edge is not included in the edge image at all, the controller 120 may stop setting the parking guide line GL, or continuously search for the edge image until the setting of the parking guide line GL is completed.

When the parking guide line GL is set by the image analyzing module 121, the distance calculating module 122 calculates a distance between the corresponding parking guide line GL and the vehicle V. In this case, the distance between the parking guide line GL and the vehicle V may mean a distance from a part of the vehicle V positioned closest to the parking guide line GL to the parking guide line GL. For example, the controller 120 may calculate the distance between the parking guide line GL and the vehicle V within a predetermined error range, based on a predetermined conversion ratio by a relation between actual physical spaces photographed by the first to fourth cameras 111, 112, 113, and 114 and the image signals of the respective channels.

Information on a reference distance may be preset in the assist information generating module 124. Accordingly, when the distance calculated by the distance calculating module 122 is greater than the reference distance, the assist information generating module 124 may output first information as control information. However, when the distance calculated by the distance calculating module 122 is equal to or smaller than the reference distance, the assist information generating module 124 may output second information as control information.

Here, the first information may be information for guiding a driver to move the vehicle V to be closer to the parking guide line GL, and the second information may be information for notifying of the driver that the vehicle V is currently positioned within the reference distance in which the parking guide line GL is recognizable.

The guide unit 130 is a configuration for receiving the control information from the controller 120, converting the received control information into a form corresponding to the type of control information, and outputting the converted control information. Particularly, the guide unit 130 may convert the first information into a first alarm signal having at least one form of an image, a sound, and a vibration, and output the first alarm signal. Further, the guide unit 130 may convert the second information into a second alarm signal discriminated from the first alarm signal and output the second alarm signal.

The guide unit 130 may include a display module 131, and may further include a sound module 132 and a haptic module 133 depending on the case. The display module 131 basically receives the combined image signal from the controller 120, and displays the combined image in the form of an around view. For example, the display module 131 may be a navigation device of the vehicle V, or a portable terminal capable of performing short-range communication with the vehicle V. Further, the display module 131 may have an interface function capable of receiving various inputs from the driver, and to this end, the display module 131 may include a physical button or a touch sensor together.

The sound module 132 outputs guide information corresponding to a current position of the vehicle V in the form, which the driver is capable of audibly recognizing, according to the control information. For example, when the first information is input, the sound module 132 may output a voice "Decrease an interval between the vehicle V and the parking guide line GL". Otherwise, the sound module 132 may output a beep continuously or repeated with a predetermined period. For another example, when the second information is input, the sound module 132 may output a voice "the vehicle V is positioned at a distance in which the parking guide line GL is accurately recognizable". A speaker may be representatively used as the sound module 132.

The haptic module 133 is a configuration for generating a vibration or an impact of a pattern corresponding to the current position of the vehicle V based on the control information, and may alert the driver through a tactile sensation. For example, when the first information is input in the state where the haptic module 133 of the vehicle V is included in the steering wheel or a seat, the haptic module 133 may notify the driver that the vehicle V is currently positioned at a distance in which the parking guide line GL cannot be accurately recognized by generating a vibration having a predetermined pattern. Otherwise, when the second information is input, the haptic module 133 may notify the driver that the vehicle V is positioned within the reference distance from the parking guide line GL, by generating no vibration or generating a vibration having a different pattern from that of the vibration according to the first information.

FIGS. 3A to 3D illustrate an example situation where the parking assist apparatus according to the first exemplary embodiment of the present invention assist parking by the driver.

The controller 120 detects the parking guide line GL through an analysis of the combined image transmitted from the AVM system 110. In this case, the controller 120 may detect the parking guide line GL through the analysis of the combined image only when the driver activates a parking mode. Hereinafter, the description will be given on an assumption that the driver activates the parking mode.

Figure 3A:
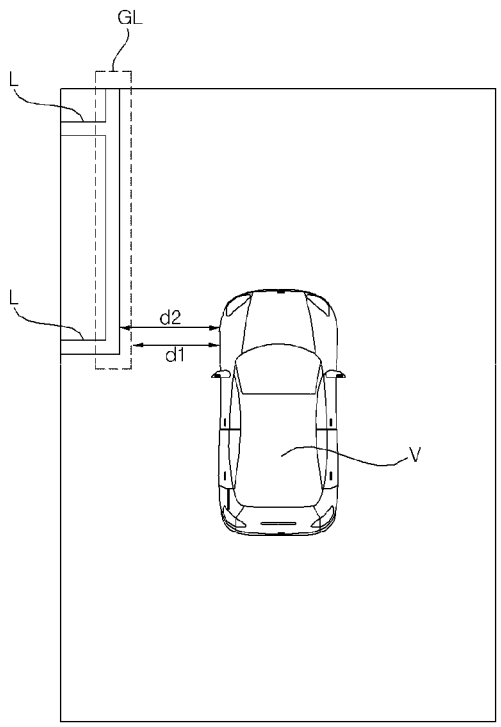
FIGS. 3A to 3D are diagrams illustrating an example situation where the parking assist apparatus according to the first exemplary embodiment of the present invention detects a parking guide line.

Referring to FIG. 3A, according to the activation of the parking mode of the vehicle V entering a parking place, a combined image displayed on the guide unit 130 and a part of the parking guide line GL included in the combined image may be confirmed. The controller 120 calculates a distance between the parking guide line GL and the vehicle V. As described above, the reference distance information is pre-stored in the controller 120, so that the controller 120 compares whether a distance between the parking guide line GL and the vehicle V exceeds the reference distance. In this case, the controller 120 may compare whether the distance between the parking guide line GL and the vehicle V exceeds the reference distance by setting a vertical distance from a predetermined point of the vehicle V to the parking guide line GL as the distance between the parking guide line GL and the vehicle V.

In FIG. 3A, a vertical distance d2 from a predetermined point of the vehicle V to the parking guide line GL is larger than the reference distance d1. That is, a partial region of the parking guide line GL is included in the combined image, but the partial region may not have a size necessary to extract information (for example, an equation of a straight line) about the accurate parking guide line GL.

Figure 3B:
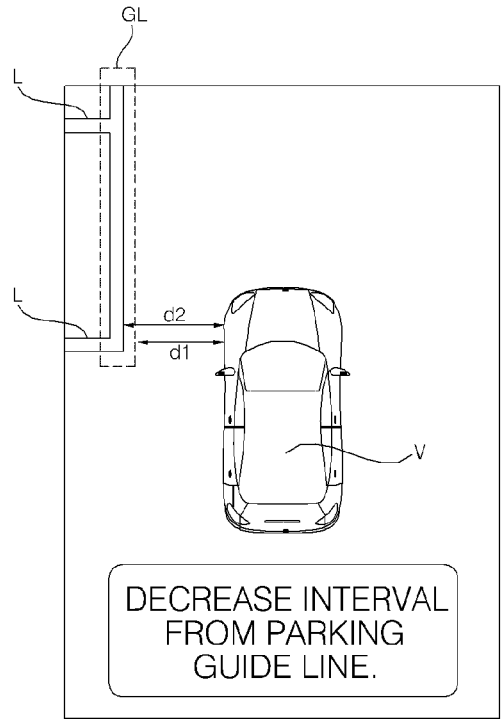

Accordingly, the controller 120 may control the guide unit 130 so that a text or a voice "Decrease an interval from the parking guide line" is displayed or output, as illustrated in FIG. 3B. Otherwise, the guide unit 130 may notify the driver that the vehicle V is currently positioned at a distance, in which the parking guide line GL cannot be accurately recognized, by generating a vibration, not a text or a voice, which has been described above.

Figure 3C:
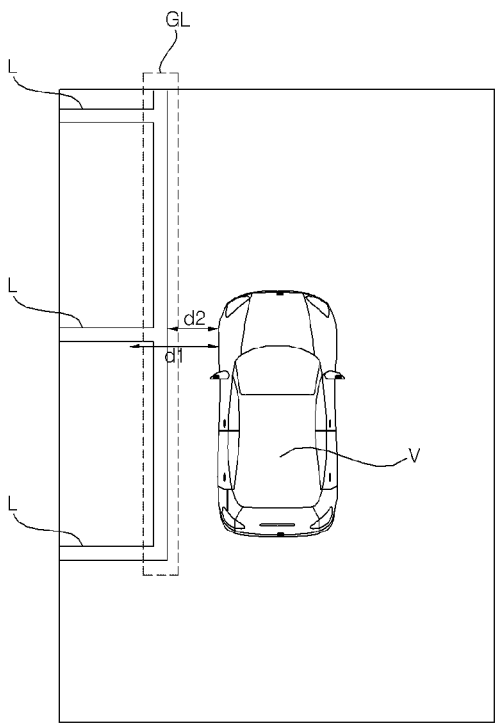
Figure 3D:
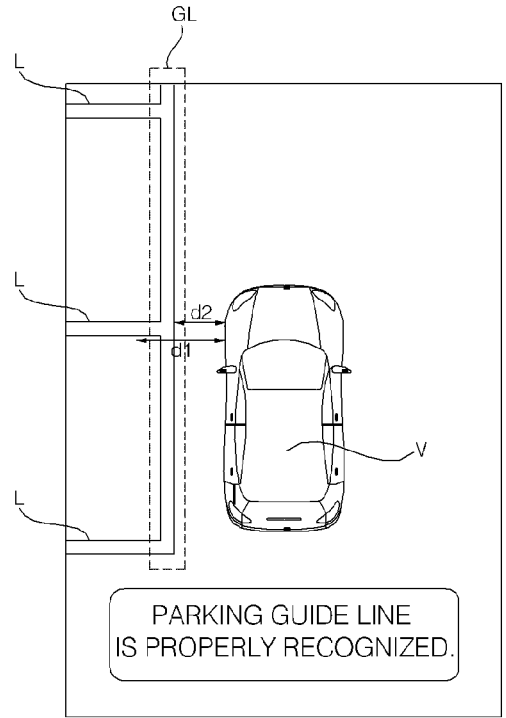

Referring to FIG. 3C, when the driver of the vehicle V receives the guide according to FIG. 3B and moves the vehicle V toward the parking guide line GL, the driver may confirm the combined image displayed on the guide unit 130 and the parking guide line GL included in the combined image. In comparison with FIG. 3A, it can be seen that a distance d2' between the vehicle V and the parking guide line GL has a size smaller than the reference distance d1 (d2'<d1<d2). Accordingly, the controller 120 may control the guide unit 130 so that a text or a voice "The parking guide line is properly recognized" is displayed or output, as illustrated in FIG. 3D.

Figure 4:
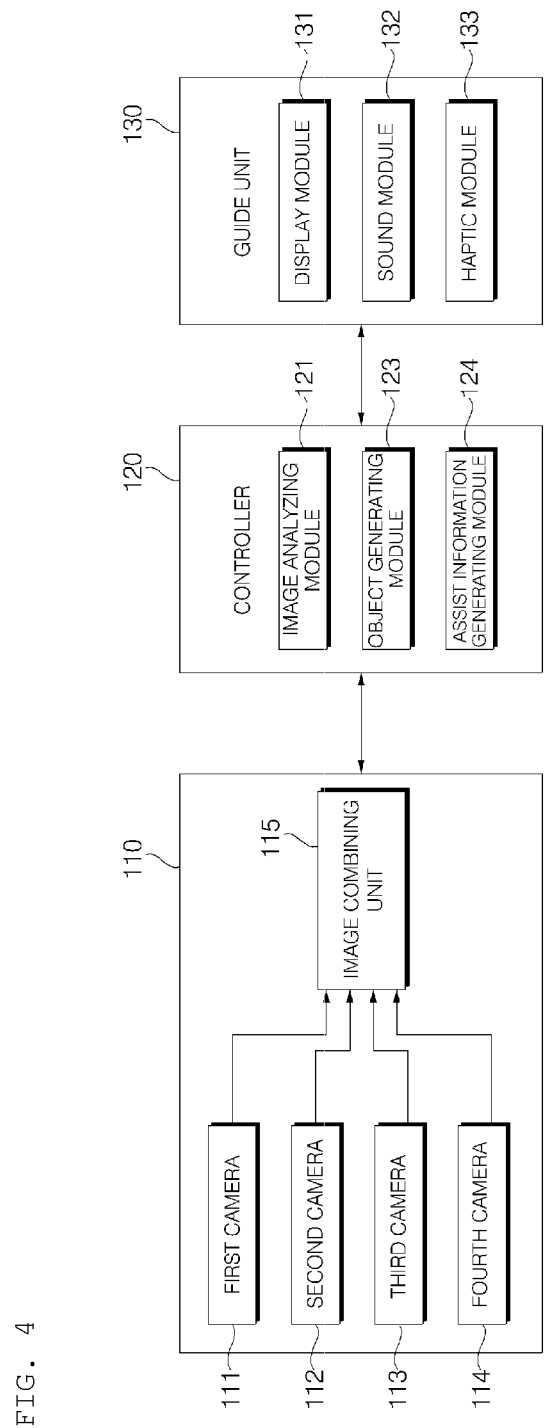
FIG. 4 is a block diagram illustrating a parking assist apparatus according to a second exemplary embodiment of the present invention.

FIG. 4 is a block diagram illustrating a parking assist apparatus according to a second exemplary embodiment of the present invention.

Referring to FIG. 4, the parking assist apparatus according to the second exemplary embodiment of the present invention includes an AVM system 110, a controller 120, and a guide unit 130.

The AVM system 110 means a system, which includes a plurality of cameras mounted in a vehicle V, combines and processes images photographed by the respective cameras, and outputs an around view image similar to an image of a region of a predetermined distance from the vehicle V or a region having a predetermined width, which is viewed in a direction of a vertical upper end of the vehicle V, similar to the first exemplary embodiment described above with reference to FIGS. 1 to 3.

The guide unit 130 is a configuration for receiving a combined image signal in the form of an around view from the AVM system 110, and displaying the received combined image signal based on control of the controller 120. The guide unit 130 will be described in detail below.

The controller 120 may receive the combined image signal from the AVM system 110, analyze the combined image signal, and detect points at which corners C (that is, points at which the parking guide line GL is connected with the other parking lines L) of a parking section are positioned.

The controller 120 may include an object generating module 123, an image analyzing module 121, and an assistance information generating module 124.

The object generating module 123 generates information about a parking assist object O which is displayed while overlapping the combined image. Here, the parking assist object O is an object indicating a predetermined region, in which the corner C of the parking section is recognizable, in a region included in the combined image, and may be displayed while overlapping the combined image by the guide unit 130. In this case, information on a size of the parking assist object O, which is to overlap the combined image, may be preset in the object generating module 123.

The image analyzing module 121 may convert the combined image into an edge image by applying an edge detection algorithm to the combined image, and detect the corner C of the parking section by applying a corner detection algorithm to the edge image. For example, the Harris corner detection method may be used as the corner detection algorithm. In the meantime since one parking section is generally a quadrangle, the image analyzing module 121 may detect a maximum of four corners C per one parking section. Further, according to the exemplary embodiment of the present invention, the image analyzing module 121 may be set to generate different control information for a case where two or more adjacent corners C are detected in one parking section and a case where one or less corner C is detected in one parking section.

When the corner C of the parking section is not included in the edge image at all, the controller 120 may continuously search for an edge image until two or more corners C are detected, as a matter of course.

The assistance information generating module 124 may output different control information based on whether the corner C is successfully recognized by the image analyzing module 121. That is, when the corner C is successfully recognized by the image analyzing module 121, the assistance information generating module 124 may output third information, and when the recognition of the corner C fails, the assistance information generating module may output fourth information.

Here, the third information may be information for notifying the driver that the corner C of the parking section is positioned within a region corresponding to the parking assist object O, and the fourth information may be information for notifying the driver that the driver needs to move the vehicle to be closer to the parking section so that the corner C of the parking section is positioned in a region corresponding to the parking assist object O.

The guide unit 130 is a configuration for receiving the control information from the controller 120, converting the received control information into a form corresponding to the type of control information, and outputting the converted control information. Particularly, the guide unit 130 may convert the third information into a third alarm signal having at least one form of an image, a sound, and a vibration, and output the third alarm signal. Further, the guide unit 130 may convert the fourth information into a fourth alarm signal discriminated from the third alarm signal and output the fourth alarm signal. The driver may recognize a position, in which the parking section exists, in the combined image through the guide unit, and reduce a time consumed for parking by adjusting a route of the vehicle V so that the corner C of the parking section is positioned within the parking assist object O according to the fourth alarm signal.

The guide unit 130 may include a display module 131, and may further include a sound module 132 and a haptic module 133 depending on the case. For example, when the third information is input, the display module 131 may display a guide message in the text form "The parking section is detected", and when the fourth information is input, the display module 131 may display a guide message in the text form "Move the vehicle V toward the parking section". Other descriptions of the display module 131 are similar to the description of the first exemplary embodiment, so that a detailed description of the display module 131 will be omitted.

The sound module 132 outputs guide information corresponding to a current position of the vehicle V in the form, which the driver is capable of audibly recognizing, according to the control information. For example, when the fourth information is input, the sound module 132 may output a voice "Move the vehicle V to be close to the parking section", or continuously output a beep or output a beep repeated with a predetermined period. For another example, when the third information is input, the sound module 132 may output a voice "The corner C exists within the parking assist object O".

The haptic module 133 is a configuration for generating a vibration or an impact of a pattern corresponding to the current position of the vehicle V based on the control information, and may alert the driver to fee a tactile sensation. For example, when the third information is input in the state where the haptic module 133 of the vehicle V is included in a steering wheel or a seat, the haptic module 133 may notify the driver that the corner C of the parking section exists within the region corresponding to the parking assist object O, by generating no vibration or generating a vibration having a predetermined pattern. In contrast, when the fourth information is input, the haptic module 133 may notify the driver that the corner C of the parking section does not exist within the region corresponding to the parking assist object O only with trembling by vibration by generating a vibration having a different pattern from that of the third information.

FIGS. 5A to 5D illustrate an example situation where the parking assist apparatus according to the second exemplary embodiment of the present invention assist parking by a driver.

The controller 120 detects corners C of the parking section through an analysis of the combined image transmitted from the AVM system 110. In this case, the controller 120 may detect the corners C of the parking section through the analysis of the combined image only when the driver activates a parking mode. Hereinafter, the description will be given on an assumption that the driver activates the parking mode.

Figure 5A:
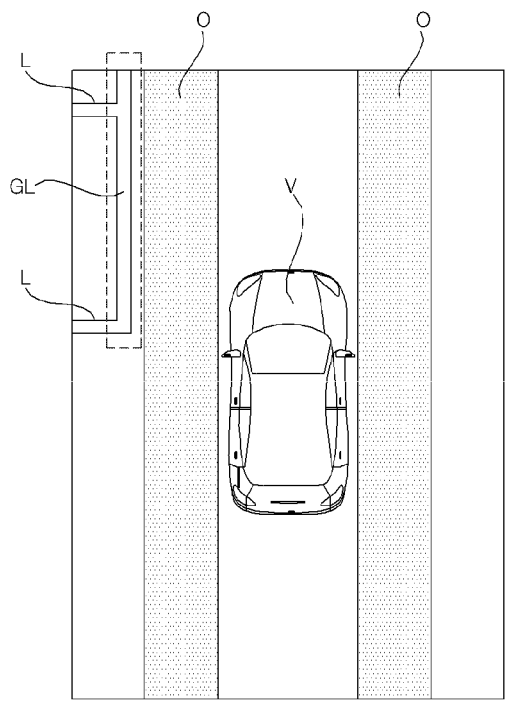
FIGS. 5A to 5D are diagrams illustrating an example situation where the parking assist apparatus according to the second exemplary embodiment of the present invention detects a parking guide line.

Referring to FIG. 5A, according to the activation of the parking mode of the vehicle V entering a parking place, a combined image displayed on the guide unit 130 and a parking assist object O overlapping the combined image may be confirmed. The controller 120 determines whether the corner C of the parking section exists in a region corresponding to the parking assist object O.

Figure 5B:
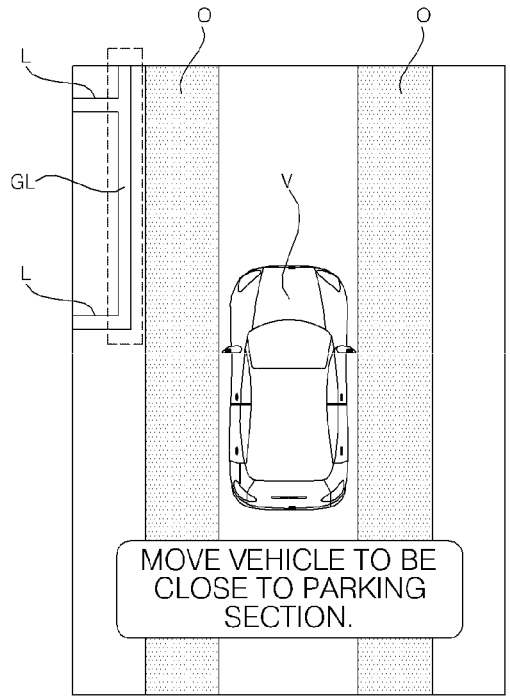

FIG. 5A illustrates the case where the corner C of the parking section does not exist in the parking assist object O (that is, the corner of the parking section is positioned outside the region corresponding to the parking assist object), and in this case, there are concerns that the driver of the vehicle V cannot receive route information for parking the vehicle V. Accordingly, the controller 120 may control the guide unit 130 so that a text or a voice "Move the vehicle to be close to the parking section" is displayed or output, as illustrated in FIG. 5B. Otherwise, the guide unit 130 may notify the driver that the vehicle V is currently positioned at a distance, in which the corner C of the parking section cannot be accurately recognized, by generating a vibration, not a text or a voice, which has been described above.

Figure 5C:
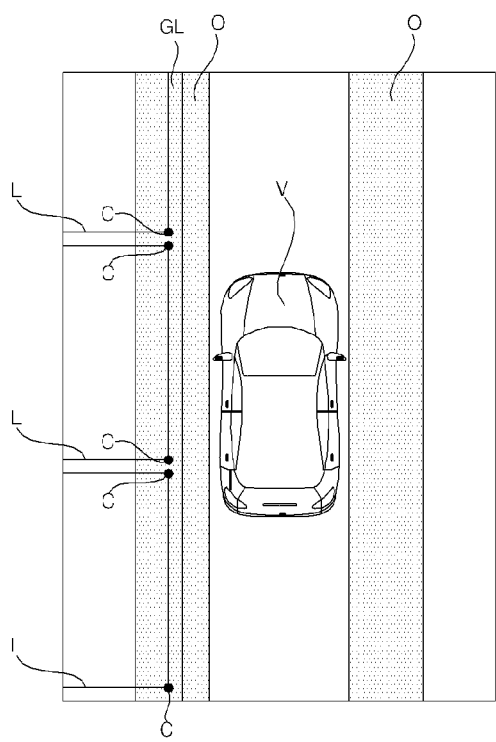

Referring to FIG. 5C, when the driver of the vehicle V receives the guide according to FIG. 5B and moves the vehicle V toward the parking section, the driver may confirm the combined image displayed on the guide unit 130 and the parking assistance object O. That is, the corner C of the parking section exists in the region corresponding to the parking assist object O, so that the parking route provided to the driver may be generated.

Figure 5D:
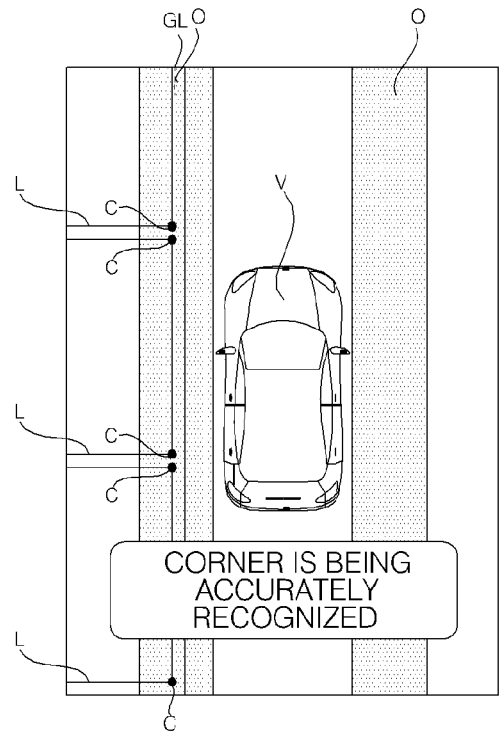

Accordingly, as illustrated in FIG. 5D, the controller 120 may change a color of the parking assist object O or change with flickering, highlighting, a line thickness, adding brightness, and the like of the parking assist object O so that the parking assist object O, in which the corner C of the parking section exists, may be discriminated from that before the detection of the corner C, and control the guide unit 130 so that the guide unit 130 displays a text or output a voice "The corner is being accurately recognized", or outputs a vibration having a predetermined pattern and the like.

Figure 6:
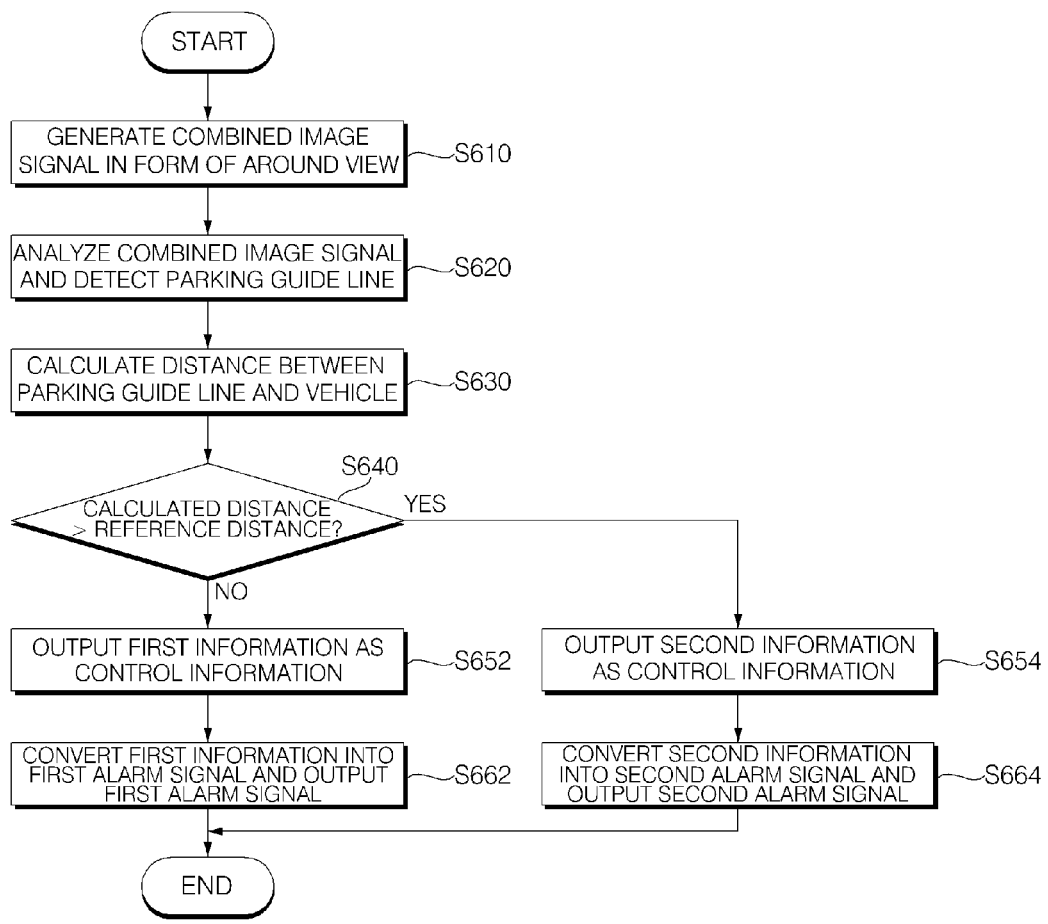
FIG. 6 is a flowchart illustrating a method of operating the parking assist apparatus according to the first exemplary embodiment of the present invention.

FIG. 6 is a flowchart illustrating a method of operating the parking assist apparatus according to the first exemplary embodiment of the present invention.

Referring to FIG. 6, in the method of operating the parking assist apparatus according to the first exemplary embodiment of the present invention, the AVM system 110 first combines images received from the plurality of cameras mounted in the vehicle V, and outputs a combined image signal in the form of an around view (S610).

Next, the controller 120 detects a parking guide line GL by analyzing the combined image signal (S620). In this case, the controller 120 may convert the combined image to an edge image by applying an edge detection algorithm to the combined image signal, and set at least one of the edges included in the edge image as the parking guide line GL.

Next, when the parking guide line GL is detected, the controller 120 calculates a distance between the parking guide line GL and the vehicle V (S630). In this case, the distance between the parking guide line GL and the vehicle V may mean a distance from a part of the vehicle V positioned closest to the parking guide line GL to the parking guide line GL. For example, the controller 120 may calculate the distance between the parking guide line GL and the vehicle V within a predetermined error range based on a predetermined conversion ratio by a relation between actual physical spaces photographed by the first to fourth cameras 111, 112, 113, and 114 and the image signals of the respective channels.

Next, when the distance between the parking guide line GL and the vehicle V is calculated, the controller 120 determines whether the calculated distance is greater than a pre-stored reference distance (S640). That is, the controller 120 compares whether the calculated distance is greater than the pre-stored reference distance so as to confirm whether the distance between the parking guide line GL and the vehicle V exceeds the reference distance.

Next, the controller 120 generates control information based on a result of the previously performed comparison (S650). Particularly, when the calculated distance is greater than the reference distance, the controller 120 may output first information as the control information (S652), and when the calculated distance is equal to or smaller than the reference distance, the controller 120 may output second information as the control information (S654).

Next, the guide unit 130 receives the control information from the controller 120, converts the control information into at least one form of an image, a sound, and a vibration, and outputs the converted control information (S660). Particularly, when the guide unit 130 receives the first information from the controller 120, the guide unit 130 may convert the first information into a first alarm signal having at least one form of an image, a sound, and a vibration, and outputs the first alarm signal (S662). Otherwise, the guide unit 130 may convert the second information into a second alarm signal discriminated from the first alarm signal and output the second alarm signal (S664).

Figure 7:
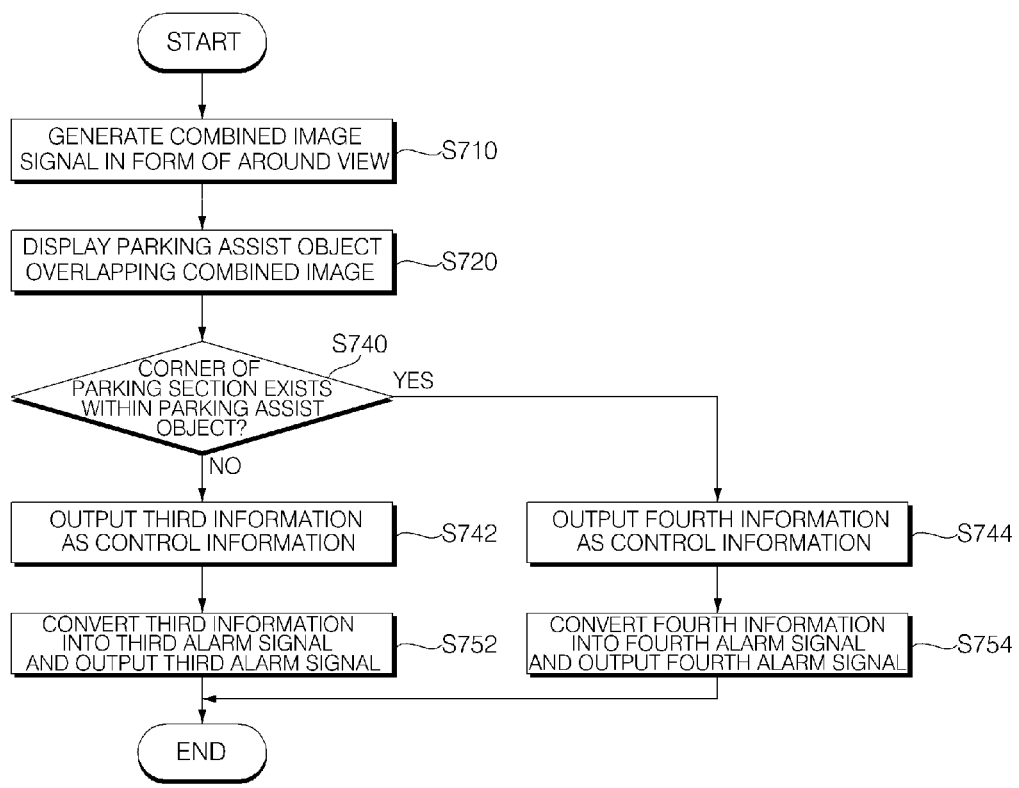
FIG. 7 is a flowchart illustrating a method of operating the parking assist apparatus according to the second exemplary embodiment of the present invention.

FIG. 7 is a flowchart illustrating a method of operating the parking assist apparatus according to the second exemplary embodiment of the present invention.

Referring to FIG. 7, in the method of operating the parking assist apparatus according to the second exemplary embodiment of the present invention, the AVM system 110 combines images received from the plurality of cameras mounted in the vehicle V, and outputs a combined image signal in the form of an around view (S710).

Next, the controller 120 controls the guide unit 130 so that the combined image is displayed while overlapping a parking assist object O (S720). That is, the combined image and the parking assist object O may be displayed while overlapping each other. The parking assist object O may mean a predetermined region in order to indicate a region, in which a corner C is recognizable by the controller 120, in the region corresponding to the combined image.

Next, the controller 120 analyzes the combined image signal, and determines whether the corner C of the parking section exists within the parking assist object O (S730). Particularly, the controller 120 may convert the combined image to an edge image by applying an edge detection algorithm to the image of the region of the combined image, which overlaps the parking assist object O, in the combined image, detect a plurality of parking lines L in an edge included in the edge image, and detect a crossing point of the plurality of detected parking lines L (that is, points at which the parking lines L and the parking lines L are connected) as the corner C of the parking section. The type of the corner C of the parking section vary, so that a detailed description thereof will be described below with reference to a separate drawing.

Next, the controller 120 may generate different control information based on the previous determination on whether the corner C exists (S740). Particularly, when it is determined that the corner C of the parking section exists within the parking assist object O, the controller 120 generates third information as the control information (S742), and when the corner C is not recognized, the controller 120 may generate fourth information as the control information (S744).

Next, the guide unit 130 outputs an alarm signal corresponding to the control information (S750). Particularly, when the guide unit 130 receives the third information from the controller 120, the guide unit 130 may convert the third information into a third alarm signal having at least one form of an image, a sound, and a vibration, and output the third alarm signal (S752). Otherwise, when the guide unit 130 receives the fourth information from the controller 120, the guide unit 130 may convert the fourth information into a fourth alarm signal discriminated from the third alarm signal, and output the fourth alarm signal (S754). For example, the guide unit 130 may display the parking assist object O by changing at least one of the parameters, such as transparency, flicker, a color, a line thickness, and brightness, for the parking assist object O based on the control information, and the parameter for the third alarm signal may be different from the parameter for the fourth alarm signal.

Figure 8A:
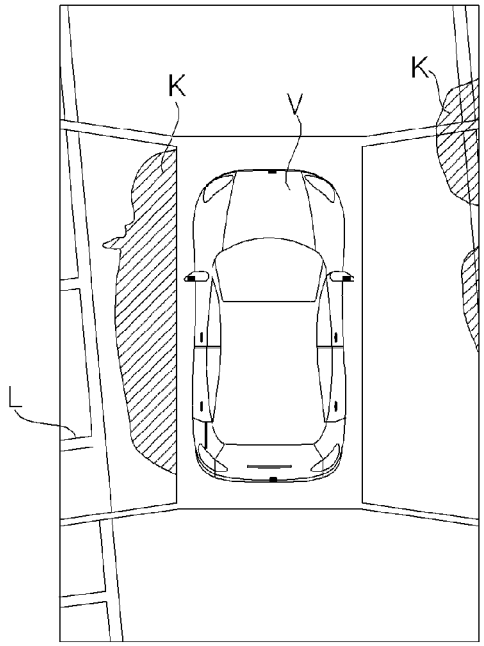
FIGS. 8A to 8D are diagrams illustrating an example of a process of detecting a parking guide line from a combined image by the parking assist apparatus according to the first exemplary embodiment of the present invention.
Figure 8B:
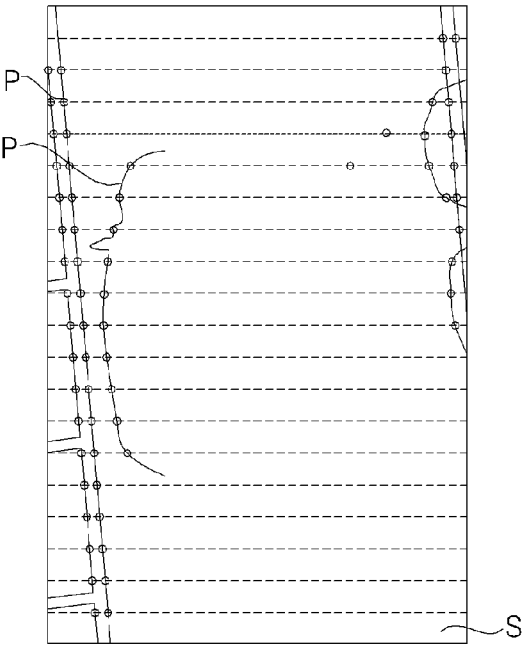
Figure 8C:
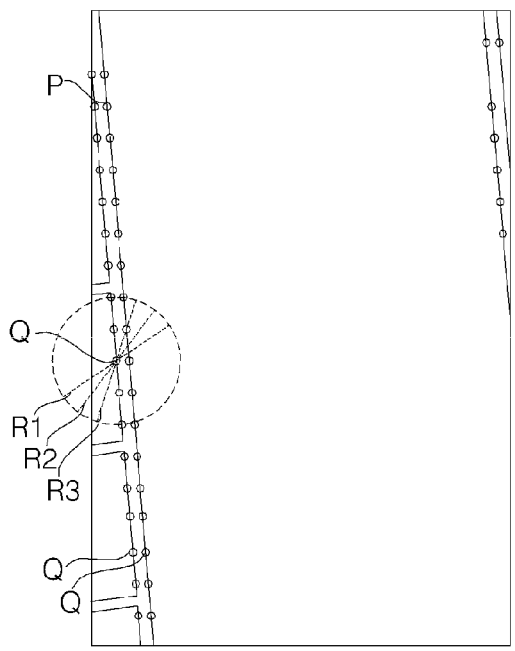

FIGS. 8A to 8D illustrate an example of a process of detecting a parking guide line GL from a combined image by the parking assist apparatus according to the first exemplary embodiment of the present invention. First, FIGS. 8B and 8C illustrate an edge image obtained from a combined image of FIG. 8A, and illustrate the edge image by reversing light and shading regions for convenience of the illustration. That is, black lines in FIGS. 8B and 8C are lines brightly (or white) displayed in the actual edge image, and a white background may be a region darkly (black) displayed in the actual edge image.

The image analyzing module 121 may obtain the edge image similar to FIG. 8B from the combined image of FIG. 8A. Further, the image analyzing module 121 may extract a plurality of candidate points Q having a predetermined brightness change pattern from the edge image as illustrated in FIG. 8C. Here, the edge image may be generated by using the publicly known edge detection method, and a detailed description thereof will be omitted.

Particularly, referring to FIG. 8B, the image analyzing module 121 may divide the edge image into a plurality of sections S. For example, the plurality of sections S may be regions generated by dividing the edge image for every predetermined interval in a first direction (for example, a vertical direction) by the image analyzing module 121.

The image analyzing module 121 may extract a plurality of feature points P by searching for each section S of the edge image in a second direction (for example, a direction orthogonal to the first direction). Here, the feature points P may mean points positioned at a border of the edge having a brightness gradient having a predetermined size or greater when each section S is searched in the second direction (for example, a horizontal direction). For example, the feature points P may be points positioned at a border of the black line and the white line included in the edge image. Accordingly, as illustrated in FIG. 8B, the feature points P positioned at the border of the edge by parking lines L and a shadow K may be extracted.

Referring to FIG. 8C, the image analyzing module 121 may detect the feature points P having a brightness change pattern of the parking guide line GL from the plurality of feature points P, and generate a combination of the candidate points Q.

For example, the parking line L is generally displayed by a bright color, such as white or yellow, so that some feature points P exhibiting the brightness change pattern in an order of dark, bright, and dark may be selected as the candidate points Q in the search in the second direction (for example, the horizontal direction) for each section S, and used for detecting the parking guide line GL. That is, the brightness change pattern may be preset so that the feature points P positioned at the edge, in which a contrast range of a bright region and a dark region has a predetermined value or greater, are detected as the candidate points Q.

In this case, a width of the bright region of the bright change pattern may be preset so as to be included in a predetermined error range based on a width of the general parking line L. For example, in the state where the image analyzing module 121 is set to recognize, as the candidate point Q, the case where the width of the bright region included in the edge image is 20 to 30 cm, the bright change pattern having the width of the dark region of 40 cm may be excluded from a target for selecting the candidate point Q. Accordingly, the feature point P of the edge line by the shadow K may be excluded from the target for selecting the candidate point Q.

The image analyzing module 121 may detect the parking guide line GL from the candidate point Q through a line fitting process. For example, referring to FIG. 8C, the image analyzing module 121 searches for each section for every predetermined angle in a 360 degree direction based on each candidate point Q, and extracts a straight line included in the edge from one or more straight lines R1, R2, and R3 passing through each candidate point Q. Accordingly, the image analyzing module 121 may set the edge including the straight line, which passes through the largest number of other candidate points Q among the extracted straight lines, as the parking guide line GL.

Figure 8D:
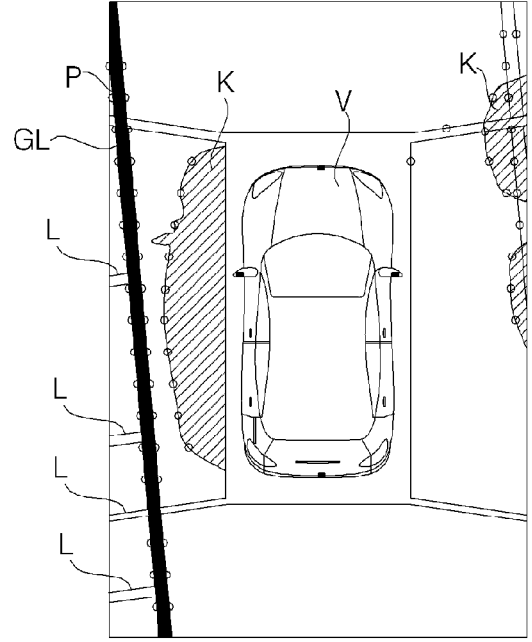

When the parking guide line GL is set, the controller may display an object indicating a region corresponding to the parking guide line GL of the combined image as illustrated in FIG. 8D.

Figure 9A:
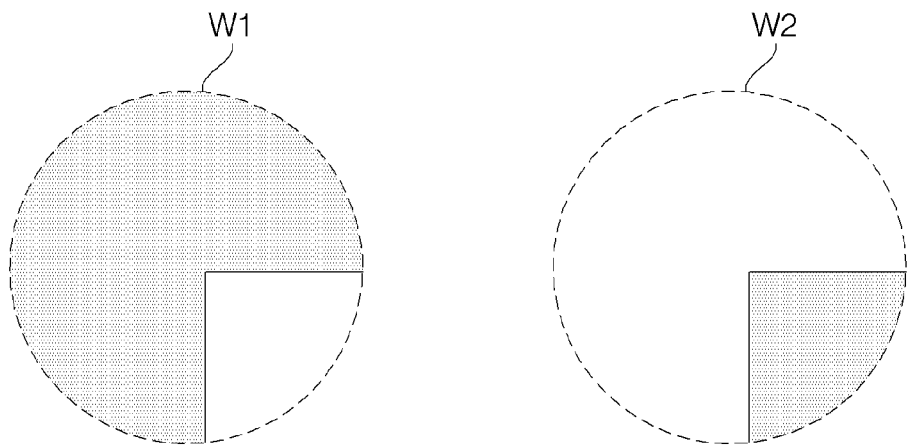
FIGS. 9A and 9B are diagrams illustrating an example of a process of detecting a corner of a parking section from a combined image by the parking assist apparatus according to the second exemplary embodiment of the present invention.
Figure 9B:
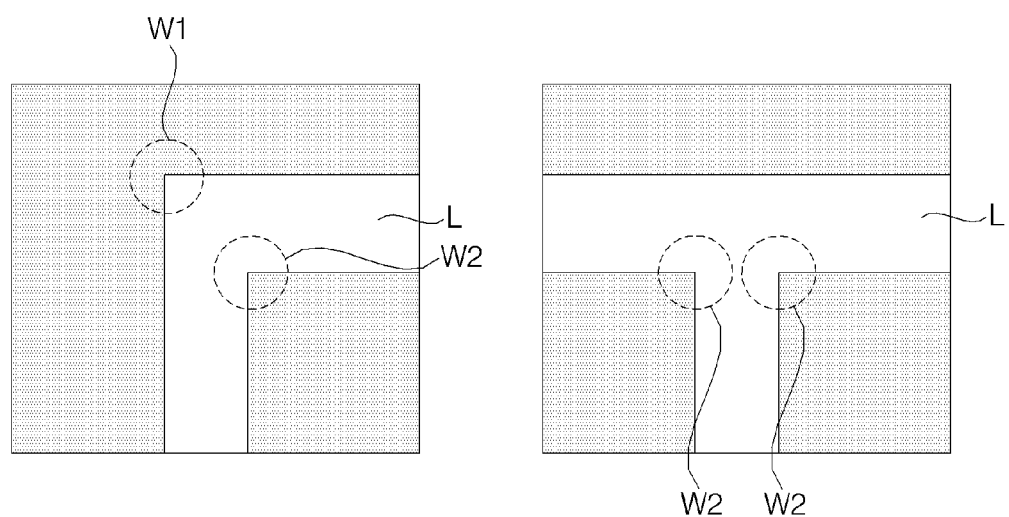

FIGS. 9A and 9B illustrate an example of a process of detecting corners C of a parking section from the combined image by the parking assist apparatus according to the second exemplary embodiment of the present invention.

When a parking section exists within the parking assist object O, the controller 120 may detect corners C of the corresponding parking section. In this case, the corners C of the parking section are formed at parts at which the parking lines L are connected with each other, so that the corners C may be detected by applying the publicly known crossing point detection method, such as the Harris corner C detection algorithm, to the edge image.

For example, as illustrated in FIG. 9A, the corner C of the parking section may include one or more first patterns W1 or second patterns W2. Here, the first pattern W1 may be a pattern in which a dark region is displayed to be more predominant than a bright region, and the second pattern W2 may be a pattern in which a bright region is displayed to be more predominant than a dark region.

The corner C may be divided into an "L" shape or a "T" shape according to a combination of the continued first pattern W1 or second pattern W2. That is, the corner C having the "L" shape may be a corner formed according to the continuity of the first pattern W1 and the second pattern W2 as illustrated at the left side of FIG. 9B, and the corner C having the "T" shape may be a corner formed according to the continuity of the second pattern W2 and the second pattern W2 as illustrated at the right side of FIG. 9B.

The image analyzing module 121 may extract the crossing points (that is, the corners) of the parking lines L configuring the parking section, as illustrated in FIG. 9B, by applying the corner detection algorithm to the edge image. For example, according to the Harris corner detection algorithm, a point, in which a change in a pixel value has a predetermined value or greater, may be detected as the corner C of the parking section, based on a pixel value within a window changing according to a movement of the window in up, down, left, and right directions within the image.

When the image analyzing module 121 detects the corners C of the parking section from the edge image, the image analyzing module 121 may detect only the corners C positioned on the parking guide line GL detected according to the first exemplary embodiment. The reason is that when the parking guide line GL is detected from all of the parking lines L configuring the parking section, the parking route information may be provided to the driver. Accordingly, it is possible to decrease a calculation quantity unnecessarily used for detecting all of the corners C of the parking section included in the edge image, and finally promptly provide a driver with guide information.

The above-mentioned exemplary embodiments of the present invention are not embodied only by an apparatus and a method. Alternatively, the above-mentioned exemplary embodiments may be embodied by a program executing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

In the present invention, various substitutions, modifications, and changes can be made within the scope without departing from the spirit of the present invention by those skilled in the art, and as a result, the present invention is not limited to the aforementioned embodiments and the accompanying drawings, but the entirety or a part of the respective exemplary embodiments may be selectively combined and implemented for various modifications.

What is claimed is:

1. An apparatus for assisting parking, comprising:
    an around view monitoring (AVM) system including a plurality of cameras mounted in a vehicle, and configured to combine images photographed by the respective cameras, and generate a combined image signal in a form of an around view;
    a controller configured to analyze the combined image signal and detect a parking guide line, calculate a distance between the detected parking guide line and the vehicle, and generate control information corresponding to the calculated distance; and
    a guide unit configured to convert the control information into a predetermined form, and output the converted control information,
    wherein the controller includes an image analyzing module configured to convert the combined image into an edge image, and set at least one of the edges of the edge image as a parking guide line,
    wherein the image analyzing module recognizes an edge having a predetermined brightness change pattern among the edges as the parking guide line,
    wherein the image analyzing module divides the edge image into a plurality of sections, detects a plurality of feature points positioned at a border of the brightness change pattern in each section, and sets a straight line, which passes through the largest number of feature points as a result of a rotation of the straight line passing through each feature point by 360 degrees, as the parking guide line.

2. The apparatus of claim 1, wherein the controller further includes:
    a distance calculating module configured to calculate a distance between the parking guide line and the vehicle; and
    an assistance information generating module configured to output first information as the control information when the calculated distance is greater than a predetermined reference distance, and to output second information as the control information when the calculated distance is equal to or smaller than the predetermined reference distance.

3. The apparatus of claim 2, wherein the guide unit converts the first information into a first alarm signal having at least one form among an image, a sound, and a vibration and outputs the first alarm signal, and converts the second information into a second alarm signal discriminated from the first alarm signal and outputs the second alarm signal.

4. An apparatus for assisting parking, comprising:
    an around view monitoring (AVM) system including a plurality of cameras mounted in a vehicle, and configured to combine images photographed by the respective cameras, and generate a combined image signal in a form of an around view including a predetermined region around the vehicle from the vehicle;
    a guide unit configured to display the combined image; and
    a controller configured to control the guide unit so that a parking assist object is displayed, determine whether a corner of a parking section exists within the parking assist object, and generate control information corresponding to a result of the determination,
    wherein the parking assist object is an object overlapping the combined image so as to indicate a predetermined region in which the corner is recognizable,
    wherein the controller includes:
    an image analyzing module configured to detect an edge from the combined image signal, and recognize the corner at the edge;
    an object generating module configured to generate information on the parking assist object displayed while overlapping the combined image; and
    an assist information generating module configured to output third information as the control information when the corner is recognized by the image analyzing module, and output fourth information as the control information when the corner is not recognized by the image analyzing module.

5. The apparatus of claim 4, wherein the predetermined region corresponds to a region from an outer side of the vehicle by a predetermined distance in the region included in the combined image.

6. The apparatus of claim 4, wherein the controller changes at least one of transparency, flickering, a color, a line thickness, and light and shade of the parking assist object, and controls the parking assist object so that the parking assist object is visually discriminated from the combined image.

7. The apparatus of claim 4, wherein the image analyzing module recognizes an edge having a predetermined corner pattern at the edge as the corner of the parking section.

8. The apparatus of claim 4, wherein the guide unit converts the third information into a third alarm signal having at least one form among an image, a sound, and a vibration and outputs the third alarm signal, and converts the fourth information into a fourth alarm signal discriminated from the third alarm signal and outputs the fourth alarm signal.

9. A method of operating a parking assist apparatus, comprising:
   combining images received from a plurality of cameras mounted in a vehicle, and generating a combined image signal in a form of an around view;
   analyzing the combined image signal and detecting a parking guide line;
   calculating a distance between the detected parking guide line and the vehicle;
   determining whether the calculated distance is greater than a reference distance;
   generating control information based on a result of the determination; and
   converting the control information into at least one form of an image, a sound, and a vibration and outputting the converted control information,
   wherein the detecting of the parking guide line includes:
      converting the combined image into an edge image;
      setting at least one of the edges of the edge image as a parking guide line;
      dividing the edge image into a plurality of sections;
      detecting a plurality of feature points positioned at a border of the brightness change pattern in each section; and
      setting a straight line, which passes through the largest number of feature points as a result of a rotation of the straight line passing through each feature point by 360 degrees, as the parking guide line.

10. The method of claim 9, wherein the generating of the control information includes outputting first information as the control information when the calculated distance is greater than a predetermined reference distance, and outputting second information as the control information when the calculated distance is equal to or smaller than the predetermined reference distance.

11. The method of claim 10, wherein the converting of the control information and outputting of the converted control information includes:
   converting the first information into a first alarm signal having at least one form of an image, a sound, and a vibration, and outputting the first alarm signal; and
   converting the second information into a second alarm signal discriminated from the first alarm signal and outputting the second alarm signal.

\* \* \* \* \*